United States Patent
Koetter et al.

(10) Patent No.: US 8,568,858 B2
(45) Date of Patent: Oct. 29, 2013

(54) METHOD FOR PRODUCING A COMPOSITE PART HAVING MULTIPART COVER LAYER AND COMPOSITE PART

(75) Inventors: Christian Koetter, Steinweiler (DE); Bernhard Baumann, Lustadt (DE); Harald Von Wantoch Rekowski, Landau/Pfalz (DE)

(73) Assignee: Faurecia Innenraum Systeme GmbH (DE)

( * ) Notice: Subject to any disclaimer, the term of this patent is extended or adjusted under 35 U.S.C. 154(b) by 423 days.

(21) Appl. No.: 12/919,976

(22) PCT Filed: Mar. 2, 2009

(86) PCT No.: PCT/EP2009/001611
§ 371 (c)(1),
(2), (4) Date: Dec. 8, 2010

(87) PCT Pub. No.: WO2009/106371
PCT Pub. Date: Sep. 3, 2009

(65) Prior Publication Data
US 2011/0097537 A1    Apr. 28, 2011

(30) Foreign Application Priority Data
Feb. 29, 2008   (DE) .................. 10 2008 012 431

(51) Int. Cl.
*B32B 3/00* (2006.01)
*B32B 3/12* (2006.01)
*B32B 3/26* (2006.01)
*B32B 1/00* (2006.01)
*B29C 65/00* (2006.01)

(52) U.S. Cl.
USPC ............. 428/174; 428/71; 428/158; 264/46.5

(58) Field of Classification Search
USPC .......... 428/31, 71, 158, 174; 296/1.08, 146.7; 264/46.4, 46.5
See application file for complete search history.

(56) References Cited

U.S. PATENT DOCUMENTS

| | | | |
|---|---|---|---|
| 6,123,356 A | 9/2000 | Gray et al. | |
| 6,447,004 B1 | 9/2002 | Kawakubo | |
| 2007/0064938 A1* | 3/2007 | Muller et al. | ................. 380/201 |

FOREIGN PATENT DOCUMENTS

| | | |
|---|---|---|
| DE | 102004021222 A1 | 12/2004 |
| EP | 1767327 A1 | 3/2007 |
| GB | 2401343 A | 11/2004 |
| JP | 5004236 A | 1/1993 |
| JP | 3347850 B2 | 11/2002 |
| WO | WO-2008/015025 | 2/2008 |

OTHER PUBLICATIONS

"International Application No. PCT/EP2009/001611, English translation of International Preliminary Report on Patentability issued Oct. 19, 2010", 13 pgs.
"International Application No. PCT/EP2009/001611, International Search Report and Written Opinion mailed Oct. 1, 2009", 23 pgs.

* cited by examiner

*Primary Examiner* — Catherine A Simone
(74) *Attorney, Agent, or Firm* — Schwegman Lundberg & Woessner, P.A.

(57) ABSTRACT

The invention relates to a method for producing a composite part, in particular an internal paneling part for vehicles, having a multipart cover layer, and a composite part.

19 Claims, 3 Drawing Sheets

METHOD FOR PRODUCING A COMPOSITE PART HAVING MULTIPART COVER LAYER AND COMPOSITE PART

PRIORITY CLAIM TO RELATED APPLICATIONS

This application is a national stage application under 35 U.S.C. §371 of PCT/EP2009/001611, filed Mar. 2, 2009, and published as WO 2009/106371 A2 on Sep. 3, 2009, which claims priority to German Application No. 10 2008 012 431.1, filed Feb. 29, 2008, which applications and publication are incorporated herein by reference and made a part hereof in their entirety, and the benefit of priority of each of which is claimed herein.

FIELD OF THE INVENTION

The invention relates to a method for manufacturing a composite part, in particular an interior trim part for vehicles, with a multi-part cover layer, as well as to a composite part.

BACKGROUND OF THE INVENTION

Composite parts are known, which comprise a carrier, a decor layer and a foam layer, which lies between the carrier and the decor layer and connects the carrier and decor layer to one another.

Moreover, it is known to construct the decor layer in a multi-part manner of at least two skins which lie adjacent to one another. The problem with the manufacture of a component with a multi-part decor layer is the fact that during the back-foaming, foam may exit in the region of the separation line between the adjacent skins.

In order to prevent this, the patent JP 3347850 discloses a method, according to which, two skins with angled end sections are arranged on the surface of a tool, in a manner such that the angled end sections of the first and second skin are directed away from the surface of the tool. The end section of a skin comprises at least one sealing section in the form of a projection, which may engage into a corresponding opening or indentation of the oppositely lying end section of the other skin. Accordingly, the skins are connected to one another in a sealing manner. Thereafter, the skins are foamed to one another.

The disadvantage of this solution is the fact that in order to ensure an adequate sealedness, the sealing sections must be designed in a relatively complicated manner, that the skins must have a certain stiffness for maintaining their shape and that one must observe an exact arrangement of the skins.

An alternative embodiment type for preventing the foaming out between the skins is known from JP 2002052548. Thereby, the carrier comprises webs, which are designed just as high as the foam layer, which is introduced at a later point in time. The first skin is applied into the tool and subsequently the second skin, wherein the second skin with its end section overlaps the end section of the first skin. Subsequently, the carrier is arranged on the skins in a manner such that the webs come to lie precisely on the overlapping regions of the first and second skin. The skins and the carrier are subsequently back-foamed.

The disadvantage of such a solution is the fact that the carrier must be designed in a very complicated manner, which renders the production of the composite part more expensive and more complicated.

A third idea is known from JP 5-4236. Hereby, the first and the second skin in each case comprise two angled end sections, which are arranged lying on one another and are subsequently sewn to one another. This possibility also prevents foam from exiting out of the course of the border between the two skins lying on one another, during the back-foaming. Moreover, a frictional fit connection between the first and the second skin is created independently of the introduced foam.

The disadvantage of the solution which is shown there, is the fact that the sewing requires great effort and thus entails a high expense with regard to cost and time.

A further method is known from EP 1 278 339 A1. In order to prevent the exit of foam, an end section of the first skin has a negative shape and an end section of the second skin has a positive shape which corresponds to the negative shape and which is introduced mechanically into the negative shape in a working step before the back-foaming. Subsequently, the skins which are mechanically joined in such a manner are back-foamed in a back-foaming tool, wherein the foam may also penetrate in a gap remaining between the negative shape and the introduced positive shape and collapses there. The mechanical joining connection is reinforced by way of this.

The disadvantage of that solution is the multitude of working steps in different tools, which are to be carried out.

SUMMARY OF THE INVENTION

It is the object of the present invention to create a simple method with which composite parts may be created with a back-foamed, multi-part cover layer, which on the one hand permits an uncomplicated arrangement of the skins forming the cover layers, whilst the back-foaming ensures an adequate sealedness and one the other hand creates a firm connection between the skins lying on one another, which ensures an adequate sealedness of the separation line even years after the manufacture.

These objects are achieved by a method and a composite part according to the independent claims. Advantageous further formations are described in the dependent claims.

The invention provides a method for manufacturing a composite part, in particular an inner trim with a multi-part cover layer of at least one first and at least one second skin, which in each case have a front side and a rear side, and a foam layer which is connected to the cover layer at the rear side. Firstly, the first and the second skin are arranged in each case with an angled end section on the surface of a tool, in a manner such that the angled end sections of the first and second skin are directed away from the surface of the tool and are adjacent one another, wherein the end section of the first skin has a channel-like structuring on the front side. Hereinafter, a channel-like structuring is always to be defined as a structuring which is negatively shaped, observed from the front side.

The channel-like structuring in the end section of the first skin is incorporated in a manner such that it lies directly opposite the front side of the angled end section of the second skin.

Furthermore, a vacuum is applied in the region of the position of the angled end sections, so that the front sides of the angled end sections are pressed on one another, and at least one channel structure is formed between the front sides of the angled end sections on account of the channel-like structuring, said structure being accessible from the side of the first and second skin, said side being away from the vacuum. Since the second skin has no structuring with a positive shape, the front side of the angled end section of the first skin is sealingly pressed onto the front side of the angled end section of the second skin by way of the applied vacuum, and the channel structure is formed on account of the channel-like structuring.

By way of the vacuum, the end sections of both skins are pressed against one another and a possible gap between these is closed. By way of the active "suctioning" of the end sections onto one another, one prevents foam mass from being able to penetrate through a gap between the end sections onto the visible surface of the skins or of the cover layer, during the back-foaming.

The vacuum thereby is applied in an uninterrupted manner along the complete separation line of the two skins, which is to be sealed and which arises on the viewed side by way of the angled end sections, in order to achieve a uniform sealing effect acting along the complete separation line. For example, a vacuum groove and/or vacuum bores may be incorporated on the tool surface directly at the envisaged position of the separation line, for applying a vacuum along the complete course of the separation line which is to be sealed.

A channel structure, between the first and the second skin, and which is accessible from the foam side, is accessible in the region of the angled end sections on account of the channel-like structuring of the first skin in the region of the angled end section, despite the pressing onto one another and the sealing due to the vacuum. This, in particular, means that material may penetrate into this channel structure, which is of great importance for carrying out the method. Subsequently, the first and the second skin are back-foamed with foam mass. Thereby, the foam mass enters into the channel structure arising between the first and the second skin, and collapses or cross-links there, on account of the density and pressure conditions of the air which prevail within the channel structure. Since the foam mass penetrating into the channel structure collapses and cross-links, the collapsed foam mass connects with a material fit to the first skin as well as to the second skin in the region of the angled end sections. By way of the cross-linking, thus a permanent bonding of the first and second skin is achieved in the region of the angled end sections. At the same time the collapsed foam mass however may not exit at the viewed side of the composite part, since a sealing effect is achieved on account of the applied vacuum in the region of the position of the angled end sections.

Inasmuch as this is concerned, the angled end section may advantageously be formed in two parts: in a sealing part in the vicinity of the later separation line, and a structured part which is arranged above the sealing part and into which foam mass may penetrate and collapse. In the sealing part, the surface of the front sides of the end sections may for example be designed in a smooth manner and without or with only a low structuring, so that the low structuring supports the sealing effect of the applied vacuum, i.e. that already a lower vacuum than is necessary for sealing a channel-like structuring such as the structured part of the end sections, is adequate for sealing the gap between the end sections of the first and second skin.

The end sections of the first and of the second skin have no structurings which engage into one another, such as a positive shape engaging into a negative shape. A joining of a positive shape and a corresponding negative shape is not possible with a sealing vacuum, since the positive shape may not be sucked into the negative shape, and for this reason the end sections come to lie to one another in an undefined manner, so that the gap between the end sections are widened in such a manner, that the manufacture of an aesthetically shaped and defined separation line may not be ensured with regard to processing technology on account of the foam which penetrates into the widened gap in an undefined manner.

It is evident from the description, that with the method according to the invention, on the one hand the manufacture of an aesthetical separation line between the first and the second skin and which is solid with regard to technology, is made possible since no foam mass may penetrate onto the viewed side. On the other hand, even after several years, at a point in time at which the back-foamed foam mass has already reduced its volume due to outgassing or other age appearances, the well-defined separation line in the region of the angled end sections of the first and second skin is preserved on account of the cross-linked connection between the first and second skin. Without the bonding according to the invention, the separation line would break up or open on account of the decreasing foam pressure.

The vacuum which is applied in the region of the angled end-sections or the separation line (sealing vacuum), differs qualitatively from the vacuum (fixation vacuum) which may be applied on inserting the skins, in order to fix the skin within the tool and hold it in position. The sealing vacuum pulls the angled end regions into the desired position and seals the angled end regions to one another.

Within the method, the fixation vacuum of the first and the second skin is only a part step and it is not sufficient to cause the required sealing between the angled end sections. At the same time, it should be noted that the presence of a fixation pressure only represents an advantageous extension of the method, i.e. is not absolutely necessary.

Within the framework of the invention, the term "skin" in particular is to be understood as the surfaced elements used for decor layers of inner trim parts of motor vehicles, such as slush skins, cast skins, spray skins, single-ply or multi-ply films, textiles or fabrics and/or leather or leather imitations. The layer thickness of such skins lies in the range of 0.5 to 1.5 mm.

If skins are bonded to one another via the cross-linked, collapsed foam, then infinite combinations of different skins may be applied.

Particularly advantageously, the angled end section of the second skin also has a channel-like structuring. A greater branching of the channel structure may be achieved by way of the fact that the angled end section of the first skin as well as the angled section of the second skin have a channel-like structuring, which finally leads to a greater and better bonding after the foam mass collapses within the channel structure and subsequently cross-links. A meshing of the channel-like structuring of the first and second skin in the context of a negative shape and an engaging positive shape however is to be avoided, in order to achieve an adequate sealing effect by way of the applied sealing vacuum.

It is particularly advantageous if the channel-shaped structuring comprises recesses between 5 mm to 1 mm; preferably from 5 µm to 500 µm. Trials with suitable foam masses have found that with the pressure conditions prevailing in the tools, a best possible bonding may be achieved by way of recesses which are in the specified boundaries. Advantageously, one may achieve good results if the angled end sections of the first and/or second skin are provided with an oil film or a similar substance, which effect a quicker collapse of the foam mass within the channel structure.

Advantageously, the channel-like structuring is formed by channels with a depth and a width between 10 µm and 200 µm, preferably between 40 µm and 100 µm. Moreover, it is particularly advantageous if the channels of the first skin as well as the channels of the second skin in each case run parallel to one another, and the channels of the first skin, and the channels of the second skin are at an angle to one another, so that a connection between the channels of the first and the second skin is possible at the crossing points. In this manner, a uniform distribution of the collapsed foam mass within the channel-like structuring of the angled end sections is conceivable.

Advantageously, the channel-like structuring is deposited as a grain before the insertion of the first and/or second skin. This may be effected in the initial molding process of the second and/or first skin. The channel-like structuring may be adapted to the selected foam mass and the prevailing pressure conditions in the tool, in this manner.

It is particularly advantageous if the first and/or second skin in the angled section comprise an opening, which represents a connection between the front side and the rear side, and through which gas located in the channel structure and/or collapsed foam may exit. The connection between the front side and the rear side thereby takes place exclusively in the region of the angled end regions which are not on the viewed side. I.e. no foam may exit onto the viewed side. Such an opening quasi represents a bleed channel for the channel structure. In this manner, gas present in the channel structure is not compressed, but exits through the opening, so that the collapsed foam mass may distribute better within the channel structure. This leads to an improved bonding.

Moreover, it is particularly advantageous, if after the application of the vacuum, the first and second skin is fixed in the tool in the region of the position of the angled end sections. The fixation may be produced mechanically with the aid of holders, as well as by way of an additional vacuum which is applied in the large-surfaced region of the skins. Thereby, the vacuum in the region of the angled end sections (sealing vacuum) is between 40% to 100% of a complete vacuum, particularly preferably larger than 60% and smaller than 90% of a complete vacuum. The percentage details relate to the air volume which must be evacuated, in order to produce a vacuum, i.e. 100% of a complete vacuum means the complete evacuation of the air volume in the region of the angled end sections or in the mould to be evacuated. The vacuum which is applied for fixing the skins is weaker than the vacuum in the region of the angled end sections. Preferably, the vacuum for fixation (fixation pressure) corresponds to the state of the art.

One advantageous further formation of the invention envisages the first skin and the second skin being arranged on the right side and the left side of a projection located on the tool surface. The positioning of the skins and thus the course of the separation line of the two skins may be fixed in a precise manner by way of the provision of such a projection. Preferably, the projection follows the complete course of the desired separation line.

Preferably, a vacuum is applied for positioning (fixation vacuum) via the projection, and this vacuum positions and fixes the skins on the projection. By way of a vacuum, the skins may not only be fixed on the projection, but it would also be possible to use the vacuum in order to close a gap between the adjacent first angled regions of the skins. In order to be able to apply a vacuum (sealing vacuum) in this region, the projection comprises at least one porous gas-permeable material or is provided with vacuum bores and/or with a vacuum groove.

Advantageously, firstly the sealing vacuum and the fixation vacuum are applied. In this manner, the skins may be applied into the tool, be pulled into position by way of the vacuum applied in the region of the later separation line, and thereafter fixed in their entirety.

Advantageously the tool, in which the first and second skin may be applied, thus comprises two vacuum pressure circuits, a fixation vacuum circuit and a sealing vacuum circuit in the region of the angled end sections, for sealing the separation line.

The method may be carried out in a particularly advantageous manner or the composite component manufactured in an advantageous manner on account of different vacuum circuits, wherein the vacuum circuits may be activated at least independently of one another. With a suitable tool with a multitude of bleed channels, thus by way of a suitable assignment of the bleed channels to the sealing circuit, one may define a multitude of different separation line courses such as S-shaped or bent separation lines or separation lines running in a spatial manner, i.e. also in the third dimension of space.

Of course these separation line geometries may be created by way of a suitable projection or lug.

One advantageous further formation of the invention envisages the projection being at least partly sunk in the tool during the curing of the foam.

A gap between the two first angled regions of the two skins is released by way of sinking the projection during the curing of the foam mass. By way of the foam mass, the skins are pressed against one another, so that this released space at least partly is closed by way of the advancing skins.

The projection may be sunk in a complete manner, or may be left for producing a design groove in a position, in which it at least partly projects into the cavity, in order to have an exactly defined groove.

One advantageous formation of the invention envisages the end section of one of the two skins being angled a second time and being arranged in a manner such that after arranging the skins in the tool, the second angled region of the end section completely covers the gap between the end sections of the first and second skin.

Preferably, the end section of one of the two skins is designed and arranged such that this not only covers the gap between the end sections, but additionally at least a part of the rear side of the oppositely lying end section. The end section in this manner is enclosed by the other end section. In this manner, on the one hand one increases the path which the foam mass must overcome in order to exit on the viewed side of the cover layer. On the other hand it is possible to utilize the foam penetrating a gap formed between an end section enclosed by the rear side and the oppositely lying inner surface of the outer lying end section, for pressing the two end sections against one another, by which means the sealing effect may likewise be increased. With such a design, the channel structure may continue to be accessible preferably via openings or recesses into the covering section.

Preferably, the skins are pre-shaped according to the described shapes of the end sections, before the arrangement in the tool.

One further advantageous formation of the invention envisages incorporating the foam mass on both sides of the end sections of the two skins, in a manner such that the foam fronts reach the end sections of the skin simultaneously.

This prevents the end sections from, due to of a pressure of the foam on the end sections being too high on one side.

In particular, it is possible to introduce different foam masses on the right and left side. One may achieve regionally different haptics by way of this.

That which has already been described with regard to the advantageousness and design also applies for the composite part according to the invention. Moreover, the claims are referred to.

DESCRIPTION OF THE DRAWINGS

The invention is hereinafter explained by way of embodiment examples which are represented by several figures. Thereby, there are shown in.

DETAILED DESCRIPTION

Figure 1A:
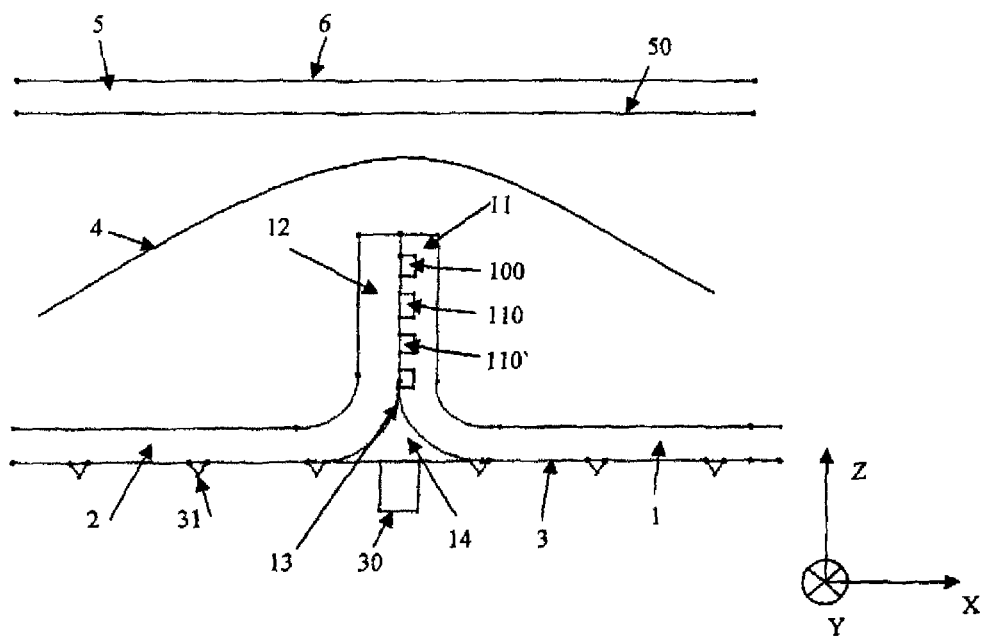
FIG. 1a an embodiment example of a method according to the invention, during the foaming procedure as well as a composite part according to the invention, FIG. 1b the embodiment example of a method according to the invention during the foaming procedure, as well as a composite part according to the invention, FIG. 2a a plan view of the angled end sections of the first and second skin of the embodiment example of FIGS. 1a and 1b, FIG. 2b an embodiment example of the channel-like structuring of the first skin, FIG. 2c an embodiment example of the channel-like structuring of the first skin, FIG. 3 an embodiment example of a method according to the invention after completing the foaming procedure as well as a composite component according to the invention.

According to one embodiment example of a method according to the invention, an inner trim is manufactured with a multi-layered cover layer. Firstly, a carrier 5 is arranged in an upper tool of a foaming tool.

In a lower tool, a first skin 1 and a second skin 2 with their ends sections 11, 12 bent in each case inwards by 90°, are arranged on the left side and right side of a device 30 for applying vacuum, which is located in the lower tool 3. The skins 1, 2 thereby are arranged in a manner such that the front sides of the angled end sections 11 and 12 are adjacent one another and are directed away from the surface of the lower tool 3. In this case, the first angled regions 11 and 12 are orientated perpendicular to the surface of the lower tool 3.

The ends of the skins 1, 2 reach roughly to the middle of the height of the cavity formed between the lower tool 3 and the upper tool 6. Alternatively, for this, the ends of the skins 1, 2 may reach to the height of the surface of the carrier 5. Thereby, in order not to hinder the flow of foam with the later foaming procedure, the carrier 5 in the region which lies opposite the ends of these angled end sections 11 and 12, must be formed in a recess in the form of an arch.

The first skin 1 in its angled end section has a channel-like structuring 100. The channel-like structuring thereby is formed by channels, wherein here one points out channels 110 and 110' by way of example.

Thereby, the position of the channels 110, 110' is selected in a manner such that a separation line 13 arises between the angled end sections 11 and 12, along which the gap between the angled end sections 11 and 12 is sealed on account of the applied vacuum in the position 14 of the region of the angled end sections.

As may be clearly recognized from FIG. 1a, the structuring 100 of the angled end section 11 of the first skin 1 in combination with the angled end section 12 of the second skin 2 forms a channel structure, into which the foam mass 4 may enter. Thereby, the dimensions of the channels 110, 110' are selected in a manner such that on entry of the foam mass 4 into the channels, the foam mass collapses and subsequently cross-links, so that a positive fit connection between the cross-linked, collapsed foam material 40 and the first angled end section 11 and the second angled end section 12 may be created.

The channels 110, 110' thereby have a width in the z-direction of 100 µm and a depth in the x-direction of 50 µm. The length of the channels in the y-direction may lie in the region of 2 mm to 10 cm, here 2 cm. In the embodiment example shown here, the channel-like structuring of the angled end section 11 is not coated with additional substances. It is basically however possible with the help of additional substances such as an oil film for example, which lies on the channel-like structuring 100, to achieve a more rapid collapse of the foam mass and subsequent cross-linking.

The skins 1 and 2 arranged in the lower tool are arranged in their position by way of applying a sealing vacuum via bleed openings which are not represented in more detail, in the device 30 of the lower tool 3.

Alternatively to the device 30 shown here, the fixation may also be carried out with the help of a lug which comprises a micro-porous material, and may additionally be provided with vacuum bores and/or a vacuum groove. A sealing vacuum is likewise applied on the lug via a vacuum groove located on the surface of the lower tool 3, by which means the skins 1, 2 on the one hand are pressed onto the lug, and on the other hand the separation line 13 between the first angled end section 11 and the second angled end section 12 is closed. The lug in this case would be designed in a manner such that it may run continuously along the complete region of the separation line 13 of the two skins 1 and 2, said region to be sealed, by which means it is ensured that a uniform pressing pressure is present along the mentioned course of the separation line. After the angled end sections 11 and 12 are sealed in the region 14, then additionally a fixation vacuum may be applied in the large-surfaced regions of the skins 1, 2 by way of air openings 31, so that these skins do no slip on closing the foaming tool and with the subsequent back-foaming. The vacuum applied by way of the device 30 here is 70% of a complete vacuum in the region 14. The vacuum applied by way of the air nozzles 31 is maximal 50% of a complete vacuum, here 40%.

After closure, the foam mass 4 is injected between the carrier and the first skin 1 and the second skin 2. In this case, the foam mass 4 on the right and left side is identical and introduced at the same time. Alternatively, also different foam masses are possible, for example in order to produce different haptics of the composite part 50. Moreover, the foam masses may be introduced staggered with respect to time depending on the desired propagation of the foam. Depending on the component to be manufactured, one may also provide only one foaming head (a simultaneous introduction of foam on the right and left side of the separation line 13 is in this case of course no longer possible) or more than only two foaming heads.

The entry location and the point in time of the penetration of the foam mass 4 into the foaming tool in this case is selected such that the foam mass 4 with its foam fronts simultaneously reaches the end sections 11 and 12. Alternatively, it is possible to introduce the foam mass in a manner such that the foam fronts reach the end sections at different times.

The foam mass 4 presses the end sections 11 and 12 against one another on hitting these, wherein a channel structure is formed on account of the channel-like structuring of the first and second skin. The foam mass 4 may penetrate into this channel structure 100, but collapses on account of the prevailing pressure conditions, and subsequently cross-links. The exit of the collapsed foam mass 40 into the region of the composite component 50 which is on the viewed side, is prevented by way of the applied sealing vacuum of the device 30. After the foam mass 4 has reached a sufficient stiffness by way of the curing procedure, the thus manufactured composite component, with a cover layer which is formed by the skins 1, 2, here an instrument panel, may then be removed from the foaming tool.

Figure 1B:
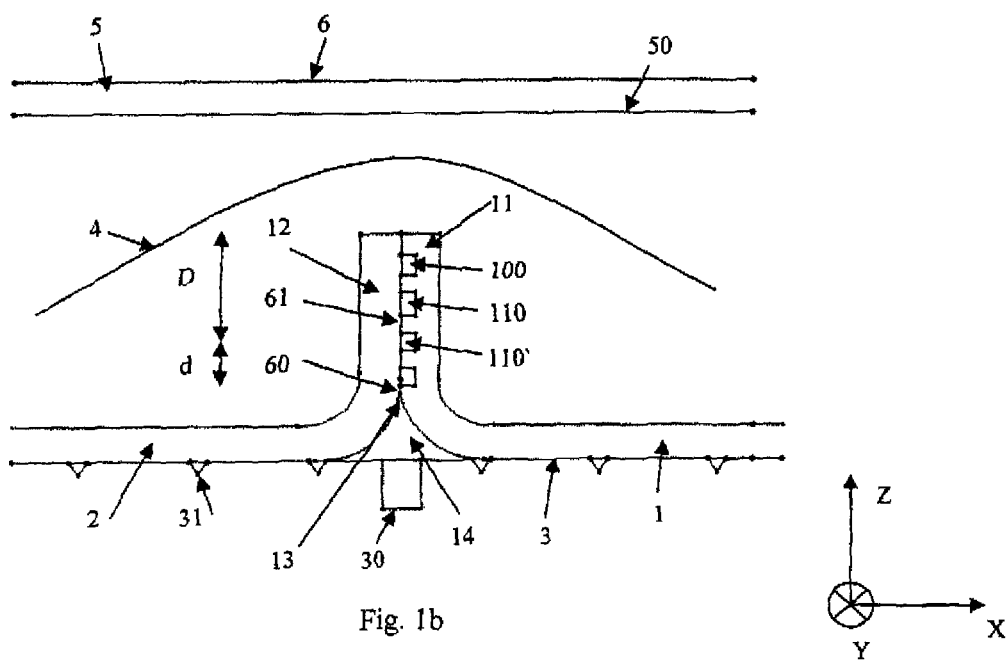

The manner of acting of the sealing vacuum in combination with the design of the angled end regions 11, 12 and the composite component 50 and 70 is to be illustrated once again in a more detailed manner by way of FIG. 1b. The angled end regions 11, 12 are pressed on one another by way of the prevailing sealing pressure, by which means the separation line 13 is defined. A sealing part 60 which is characterised in that the surfaces of the angled end regions 11, 12 which bear on one another have no channel-like structure, is located between the separation line 13 and the beginning of the channel structure 100. In the sealing part 60 which extends over a height d in the z-direction, the surfaces of the angled end regions bear on one another in a manner such that no foam may get from the structured part 61 of the angled end regions onto the viewed side of the composite part 50. The structured part 61 has a height D in the z-direction. The composite part 70 also comprises a sealing part and a structured part.

The carrier 5 in this embodiment example is of PP with a glass fibre component. Other materials are of course also possible, in particular thermoplastic plastics such as POM or ABS/PC, including additions such as fibres or minerals for example. The thickness of the carrier is about 2.4 mm. The first skin is a soft, flexible PVC slush skin with a thickness of 1 mm. The hardness is about 50 Shore A, The second skin is a sturdy TPU slush skin with a thickness of likewise 1 mm. The hardness is about 80 Shore A. The angled end sections 11, 12 including the channel-like structuring 100 of both skins were preformed within the framework of the slush process. A PU-foam was used as a foam mass 4 in the embodiment example of FIG. 1a. Alternative skins are PVC and/or TPU or a TPO film.

Alternatively to the above foaming method, it is likewise possible to introduce the foam mass when the tool is opened and only then to close the tool.

Figure 2A:
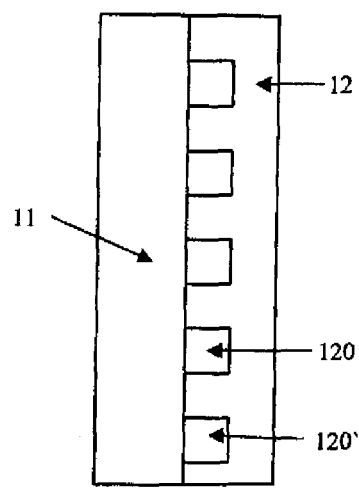

In FIG. 2a, the angled end sections 11 and 12 of FIG. 1a are shown in a plan view, i.e. with a view onto the rear side of the first skin 1 and the second skin 2, observed from the carrier 5. Additionally to the already explained channels 110, 110' of the angled end section 11, the angled end section 12 of the second skin 2 likewise comprises channels (here 120, 120' by way of example). Thus a channel structure arises when the end sections are applied onto one another, wherein the channels 120 and 110 intersect at an angle of approx. 90°. Of course, other angles are also possible for example in the range of 30° to 120°. In the example shown here, the collapses foam penetrates at the top into the channel 120 and, seen in the z-direction, runs downwards and at the crossing point with the channel 110 fills this running in the y-direction. In this manner, a surfaced bonding is rendered possible by way of the channel structure which is formed by the channels 110, 110', 120, 120'.

Figure 2B:
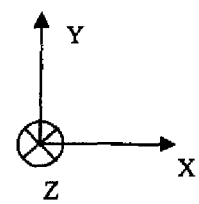
Figure 2B:
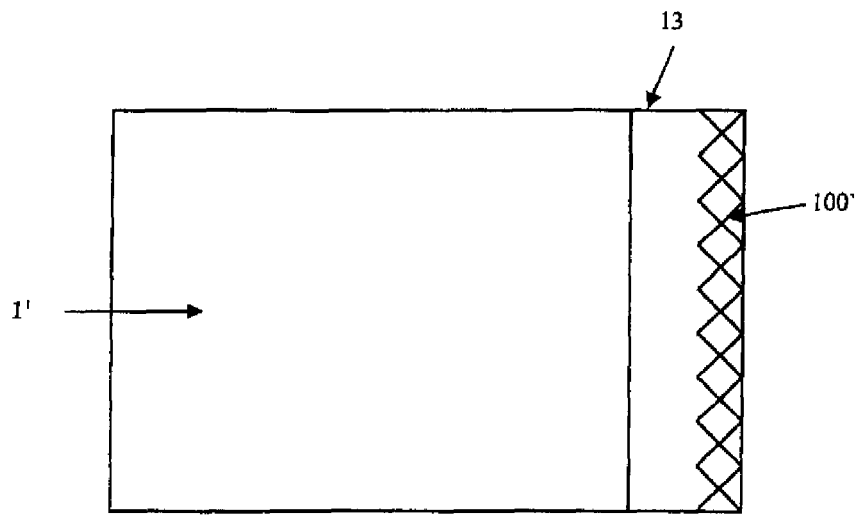
Figure 2C:
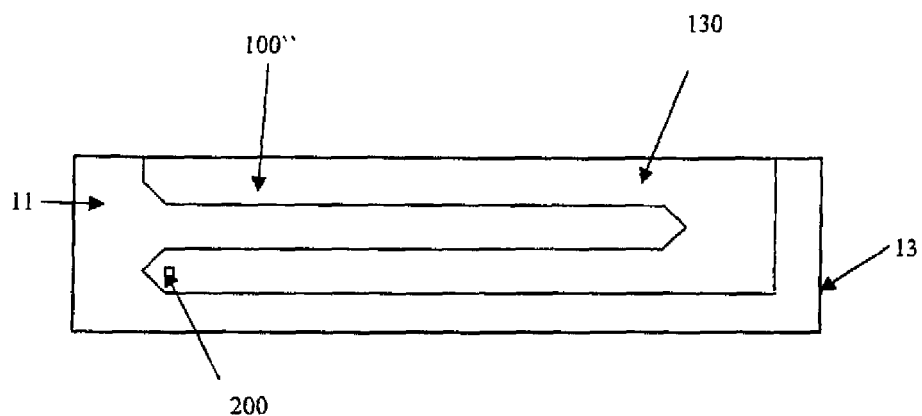

A further embodiment of a channel-like structuring 100' is shown in FIG. 2b. One may see the first skin 1 and the expected separation line 13. A channel-like structuring 100' is to be seen on the right of the expected separation line 13, and this structuring was incorporated in the form of a grain in the original molding process of the slush skin. In combination with the second skin 2, whereby this may have an additional channel-like structuring or not, a channel structure results between the angled end sections 11 and 12, which runs in a more irregular manner than that described in FIG. 1a and FIG. 2a. Nevertheless, foam mass may also penetrate into this channel structure and subsequently collapse. The grain thereby is of a nature such that the recess is between 5 µm and 20 µm deep and the width of the individual grain groove is approx. 50 µm. The "sealing part" 60 and the structured part 61 of the angled end section may be easily recognized by way of FIG. 2b.

A further embodiment example of a channel-like structuring is shown in FIG. 1c. The first skin 1 thereby in turn is shown with the anticipated separation line 13. The channel-like structuring 100" is a channel 130 which is incorporated in the angled end section 11 and runs in a meandering manner. An opening 200 is incorporated at the end of the meandering channel 130, said end facing the separation line 13. The opening 200 connects the front side, which is not shown, to the represented rear side of the angled end section 11. Gas located in the channel 130 is pressed outwards through the opening 200, until the (collapsed) foam mass completely fills the channel, in the case that foam mass penetrates into the channel-like structuring 100", i.e. into the channel 130. In this manner, it is ensured that the complete meandering channel 130 with the (collapsed) foam mass is filled out and is bonded to the angled end section 12 of the second skin 2 over the whole length.

Figure 3:
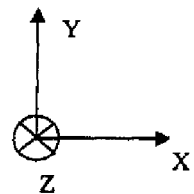
Figure 3:
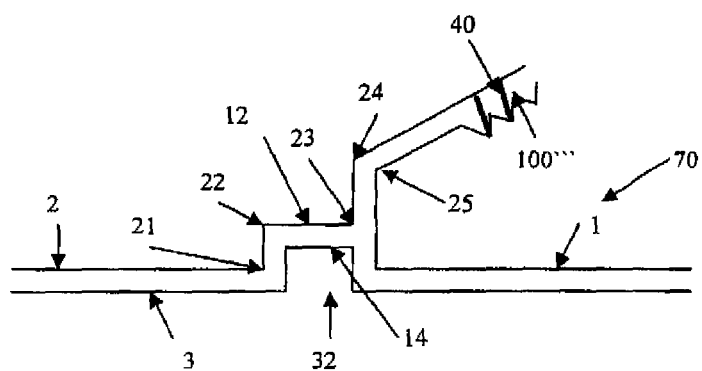

A further embodiment example of a composite part 70 according to the invention after the back-foaming procedure is shown in FIG. 3. Essentially the lower tool 3 comprises a projection 32, which engages onto a double angled region of the angled end section 12. The areal 14a is bled via the projection 32 which has a micro-porous surface for applying a vacuum.

The angled end section 12 thereby has a double angled first region which contains the bending (angled part) 21, 22, 23. Moreover, a second bending (angled part) 24 is present, which runs from the section which is perpendicularly upright between the reference numerals 23 and 24, at an angle of approx. 45°. All bendings or angled parts hereby are already incorporated in the initial molding process of the second skin 2. In FIG. 3, the first skin 1 also has an additional bending 25. This arises on account of the internal stress of the second skin 2, i.e. the additional bending 25 is caused by the second bending 24. Moreover, the first skin 1 has a channel-like structuring 100''', in which a cross-linked collapsed foam mass 40 is schematically indicated, which connects the first skin 1 and the second skin 2 to one another with a material fit at the angled end sections 11 and 12.

The advantage of the second bendings 24, 25 lies in the fact that a greatly improved sealing effect may be achieved with the additional intrinsic stress which occurs on account of the second bendings of the first and second skin. A composite component 70 with end sections which are doubly angled in such a manner, has a greatly improved separation line which leads to a longer life duration of the composite part.

The bendings 21, 22, 23, 24 which may be introduced already in the initial molding or forming process, are in total four bendings. The group 21, 22, 23 belonging to the first bending is to be understood as a part of the first bending. The second bendings 24, 25 are characterised by the fact that the end sections of the first and second skin bear on one another in front of, as well as after the second bending. In the embodiment shown here, the angle of the second bending is 45°. It may however also run in another range, preferably between 30° to 60°. Of course, the feature of the second bending may also be combined with the other embodiment example and the advantageous embodiments.

The advantages of the method according to the invention and of the composite part which may be manufactured therewith, in particular lie in the possibility of combining different skins in 3 dimensions, for example high-quality with low-quality, in the easy introduction and positioning of the skins, in the sealing of the separation line by way of the applied vacuum, in the visible material transition with a viewed gap, in the bonding of the first and second skin to one another, in the increase in the perceived value and in the integration of the joining process of the skins in the framework of the foaming process.

What is claimed is:

1. A method for manufacturing a composite part to be used as an inner trim with a multipart cover layer from at least one first and at least one second skin, which in each case have a front side and a rear side, and with a foam layer which is connected to the cover layer on the rear side, comprising:

arranging the first and the second skin in each case with an angled end section on the surface of a tool, in a manner such that the angled end sections of the first and second skin are directed away from the surface and are adjacent, wherein the end section of the first skin on the front side has a channel-like structuring;

applying a vacuum in the region of the position of the angled end sections, so that the front sides of the angled end sections are pressed on one another in a sealing manner and on account of the structuring at least one channel structure is formed between the front sides of the angled end sections, which is accessible from the side of the first and second skin, said side being away from the vacuum; and back-foaming the first and second skin with a foam mass, wherein the foam mass enters into the channel structure and collapses and cross-links.

2. The method according to claim 1, wherein the first and/or the second skin in the angled end section comprises an opening, which represents a connection between the front side and the rear side, through which gas and/or collapsed foam mass, which are located in the channel structure, may exit.

3. The method according to claim 1, wherein the end section of the second skin likewise comprises a channel-like structuring.

4. The method according to claim 1, wherein the channel-like structuring is a recess of 5 micrometers to 1 millimeters.

5. The method according to claim 1, wherein the channel-like structuring comprises channels with a depth and a width, wherein the depth and the width are between 10 micrometers and 200 micrometers.

6. The method according to claim 1, wherein the channel-like structuring is incorporated as a grain before the insertion of the first and/or second skin.

7. The method according to claim 1, wherein the first and/or second skin are fixed in the tool after the application of the vacuum in the region of the position of the angled end sections.

8. The method according to claim 1, wherein the vacuum in the region of the position of the angled end sections is selected in a manner such that a sealed separation line along the angled end sections is present between the front sides and rear sides of the first and second skin, outside the end sections.

9. The method according to claim 1, wherein the channel-like structuring is a recess of 5 micrometers to 500 micrometers.

10. The method according to claim 1, wherein the channel-like structuring comprises channels with a depth and a width, wherein the depth and the width are between 40 micrometers and 100 micrometers.

11. A composite part comprising:

a multi-part cover layer of at least one first and a second skin, which in each case have a front side and a rear side, and with a foam layer which is connected to the cover layer on the rear side, wherein the first and the second skin in each case have an angled end section and are arranged to one another in a manner such that the angled end sections along a separation line project into the foam layer and are in contact with one another with their front sides, wherein at least the end section of the first skin, said end section projecting into the foam layer, comprises at least one channel-like structuring, so that a channel structure which is accessible from the foam layer, is formed between the front sides of the end sections, said front sides being in contact, and the channel structure comprises cross-linked foam raw material.

12. The composite part according to claim 11, wherein the end section of the second skin likewise comprises a channel-like structuring.

13. The composite part according to claim 11, wherein the channel-like structuring is a recess of 5 micrometers to 2 millimeters.

14. The composite part according to claim 11, wherein the channel-like structuring comprises channels with a depth and a width, wherein the depth and the width are between 10 micrometers and 200 micrometers.

15. The composite part according to claim 11, wherein the first skin and/or the second skin in the angled end section have a second bending.

16. The composite part according to claim 11, wherein the first and/or second skin in the angled end section has an opening, which represents a connection between the front side and the rear side, through which gas located in the channel structure and/or collapsed foam mass, may escape.

17. The composite part according to claim 11, wherein the composite part is manufactured according to a method of claim 1.

18. The composite part according to claim 11, wherein the channel-like structuring is a recess of 5 micrometers to 500 micrometers.

19. The composite part according to claim 11, wherein the channel-like structuring comprises channels with a depth and a width, wherein the depth and the width are between 40 micrometers and 100 micrometers.

* * * * *

UNITED STATES PATENT AND TRADEMARK OFFICE
CERTIFICATE OF CORRECTION

PATENT NO. : 8,568,858 B2  Page 1 of 1
APPLICATION NO. : 12/919976
DATED : October 29, 2013
INVENTOR(S) : Koetter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 524 days.

Signed and Sealed this
Fifteenth Day of September, 2015

Michelle K. Lee
*Director of the United States Patent and Trademark Office*